Figure 1:
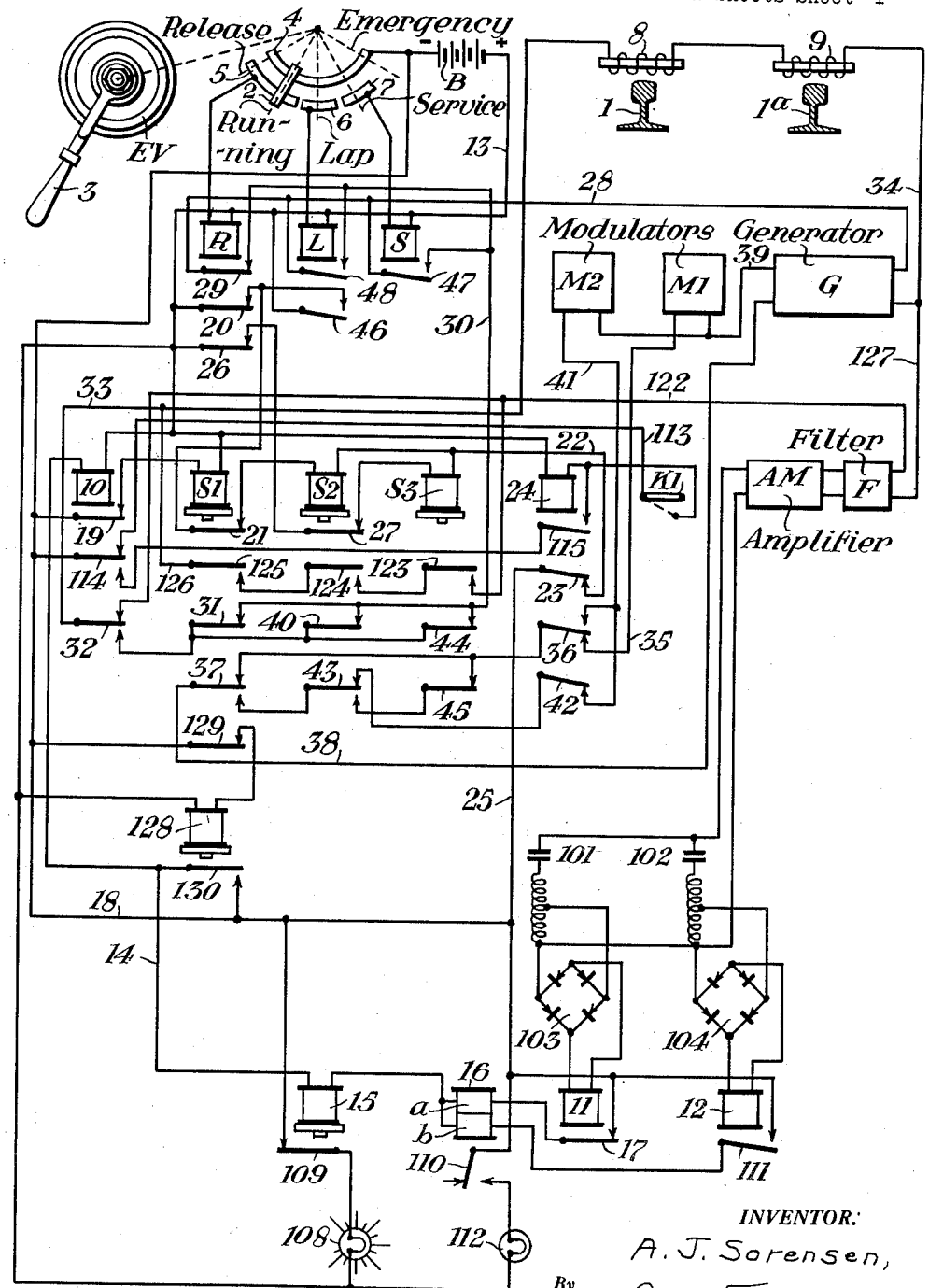

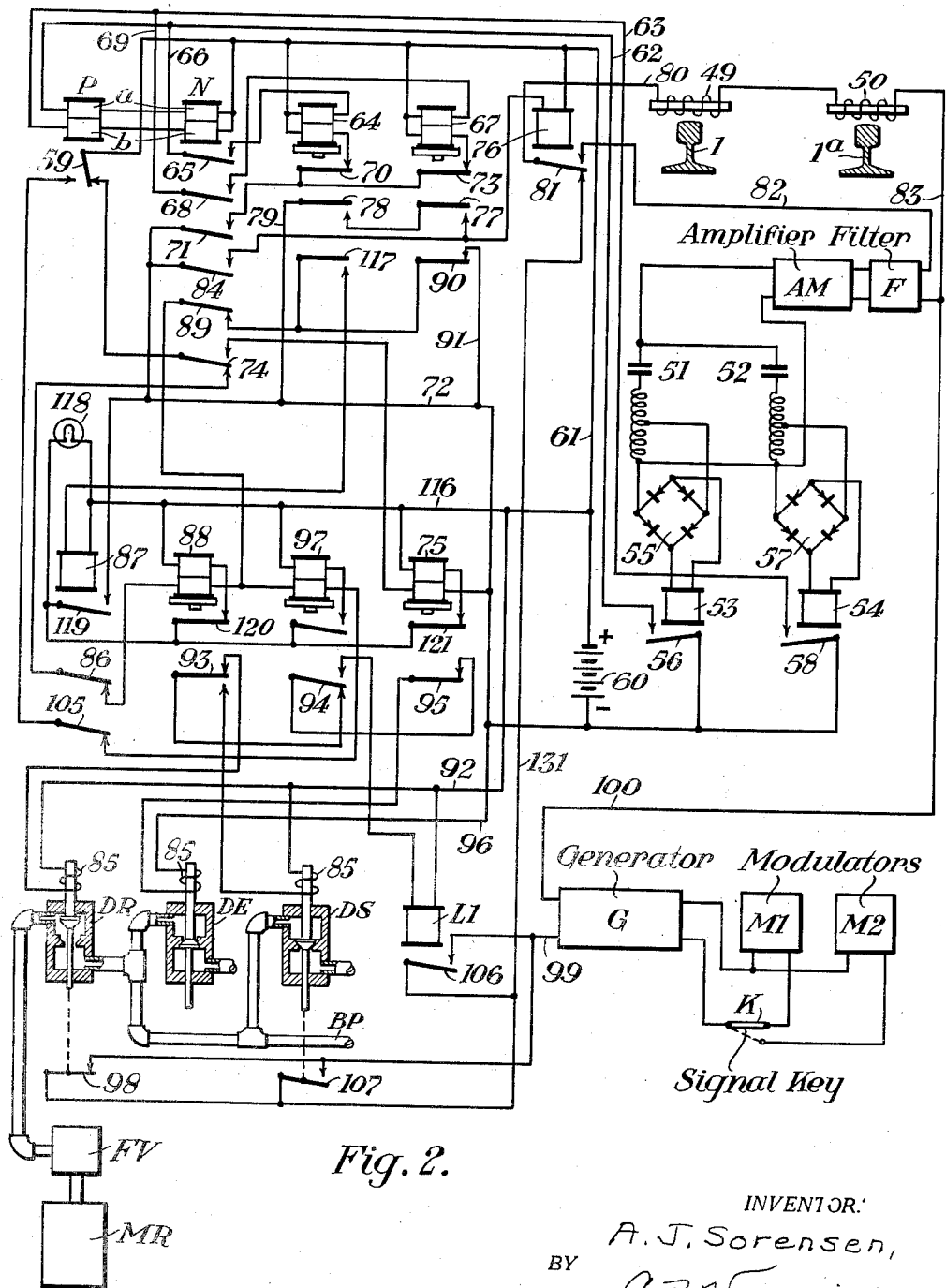

Patented Aug. 7, 1934

1,968,968

UNITED STATES PATENT OFFICE 1,968,968

ELECTRIC CONTROL SYSTEM

Andrew J. Sorensen, Pittsburgh, Pa., assignor to The Union Switch & Signal Company, Swissvale, Pa., a corporation of Pennsylvania Application September 2, 1931, Serial No. 560,687

7 Claims. (Cl. 177—353)

My invention relates to electric control systems, and particularly to electric control systems adapted to control the brakes of railway trains.

I will describe one form of apparatus embodying my invention, and will then point out the novel features thereof in claims.

The accompanying drawings, Figs. 1 and 2, constitute a diagrammatic view of one form of apparatus embodying my invention when applied to a communicating and brake control system for a railway train. The apparatus of Fig. 1 is that located at the control point, which, in this instance, is on the locomotive with the operation of the apparatus governed by the condition of the usual engineer's brake valve. The apparatus of Fig. 2 is that installed at another point on the train to control in addition to a signaling device an auxiliary brake controlling mechanism adapted to reproduce certain functions of the engineer's brake valve on the locomotive. While the apparatus of Fig. 2 may be located at any point on the train, it will be referred to in the following description as being installed in the caboose of a freight train. In order that the operator on the locomotive may know the condition of the auxiliary brake controlling mechanism, the apparatus of Fig. 2 is arranged to periodically transmit a return influence to the apparatus of Fig. 1. Furthermore, messages may be exchanged between the locomotive and the caboose by means of signaling devices without interfering with the normal control.

Although I am here disclosing a specific application of my invention, it will be understood that I do not wish to limit myself to control systems for railway trains only, as my invention is equally useful for other control systems where an apparatus located at one location is to be governed from a remote point.

In the system here disclosed a different control code is established for each brake controlling condition. A control code consists of a carrier current that is successively modulated at different modulated frequencies in a predetermined order to thus form in effect a distinctive group of control impulses having substantially no intermission between the individual impulses. In order that the operator on the locomotive may be kept informed of the proper operation of the apparatus in the caboose the carrier current is interrupted for a given interval at the end of a group of modulated control impulses and a single return impulse is transmitted from the caboose to the locomotive apparatus. That is to say, after the carrier current has been modulated by the modulating frequencies in the predetermined order the apparatus at the control point assumes receiving condition waiting for a return impulse from the controlled point to arrive and after this has been received it again assumes transmitting condition and the carrier current is again modulated in the same predetermined order of the modulating frequencies. This alternate action of transmitting and receiving, is then repeated in cyclic order as long as the established brake condition remains in effect.

The exchange of communicating signals between the two locations is governed by a special manually operated key provided at each location. When one of these keys is operated a distinctive modulating frequency is established for the carrier current sent out from that location which governs a signaling device at the opposite location and at the same time retains in effect the condition established by the normal control.

The establishing of a new code group of modulating frequencies for the carrier current sent out from the locomotive is initiated only at the completion of the preceding group. That is, the new code is first made effective after the interval a return indication impulse is received. Also a communicating impulse is not initiated during the transmission of a brake control code of impulses, and thus there can be no false group of modulating frequencies created by a change in the brake condition or by the sending of communicating signal messages.

Referring to Fig. 1, the reference character EV designates the usual engineer's brake valve of the standard type capable of establishing the "release", "running", "lap", "service" and "emergency" condition of the brake pipe pressure. As shown schematically the contactor 2 is connected to and operated by the handle 3 of the valve EV. The contactor 2 is adapted to engage the arcuate contact member 4 in all positions of the handle 3 and to engage the contact 5 in both the release and running positions, and to engage the contacts 6 and 7 in the lap and service positions, respectively. Associated with these contacts are three relays R, L and S. Current for energizing these relays is supplied by a battery B over simple circuits that can be easily traced and it seems sufficient to point out that with the handle 3 in either the release or running position so that contactor 2 engages contacts 4 and 5 the relay R is energized. With the handle 3 at the lap position, where contractor 2 engages contacts 4 and 6 the relay L is energized, while when the handle 3 occupies the service position and contactor 2 engages the contacts 4 and 7 the relay S is energized. The contacts 5, 6 and 7 are built so that as the handle 3 is being moved from one operating position to another the contactor 2 will engage the contact associated with the position to which the handle is being moved before it becomes disengaged from the contact associated with the position from which the handle 3 is leaving. It follows then that one of the relays R, L or S will be energized at all times except when the valve EV is placed in its emergency condition.

At the control point there is provided a generator G of carrier current of a frequency, such for example, as five thousand cycles per second. The output of the generator G is modulated in the usual manner by the modulators M1 and M2 which may be generators of low frequency currents of, say, forty and fifty cycles per second, respectively. However, it will be understood that I am not limited to these specific frequencies but they are given by way of illustration only. Generator G and the modulators M1 and M2 may be one of many well known types, among them being the vacuum tube type. As the specific type of neither the generator G nor the modulators M1 or M2 form a part of my invention they are indicated by a symbol only in order to simplify the drawings.

The inductor coils 8 and 9 are mounted on the locomotive in inductive relation with the traffic rails 1 and 1ᵃ, respectively. By means of these inductor coils energy is transmitted to the traffic rails from the generator G as will be shortly pointed out. Furthermore, by means of the inductor coils 8 and 9 energy is at times picked up from the traffic rails and applied to a receiving device. The coils 8 and 9 are switched from the transmitting circuit to the receiving circuit automatically as will appear as the specifications progress.

The current supplied by the generator G to the inductor coils 8 and 9 is governed by the slow-relasing relays S1, S2 and S3 in conjunction with a fourth relay designated by the reference character 10. Assuming for the time being that the handle 3 of the valve EV occupies the running position and that a relay 11 to be described later is energized, a circuit can be traced from the positive terminal of the battery B along wire 13, winding of relay 10, wire 14, winding of a relay 15 to be described later, the winding a of a relay 16 also to be referred to later, front contact of armature 17 of the relay 11 and wire 18 to the negative terminal of the battery B. The relay 10 being thus energized a circuit is closed from the positive terminal of the battery B along wire 13, winding of the relay S1, front contact of armature 19 of relay 10 and wire 18 to the negative terminal of battery B. As relay S1 becomes energized current flows from the positive terminal of battery B along wire 13, front contact of armature 20 of relay R, front contact of armature 21 of relay S1, winding of relay S2, wire 22, back contact of armature 23 of a relay 24, and wires 25 and 18 to the negative terminal of battery B. When the relay S2 becomes energized, current flows from the positive terminal of the battery B along wire 13, front contact of armature 26 of relay R, front contact of armature 27 of relay S2, winding of relay S3 and then from this point to the negative terminal of the battery B by the same circuit just traced in connection with the relay S2.

When relay 11 becomes deenergized it opens the circuit to the relay 10 and the armatures of that relay immediately drop out of engagement with their front contacts and into engagement with their back contacts. As the relay S1 is provided with slow release characteristics its armatures will remain in engagement with their front contacts during the release period of the relay S1 after the relay 10 becomes deenergized to open the circuit to the relay S1 at the front contact of the armature 19. While relay S1 is retained energized after relay 10 drops the transmitting circuit is closed from the generator G to the inductor coils 8 and 9. This transmitting circuit can be traced from the generator G along wire 28, front contact of armature 29 of relay R, wire 30, front contact of armature 31 of relay S1 or by the front contact of armature 40 of relay S2 or by the front contact of the armature 44 of the relay S3, as these three armatures are in parallel, back contact of armature 32 of relay 10, wire 33, coils 8 and 9 and wire 34 to the opposite terminal of the generator G. With the relay S1 energized, a circuit is completed also for the modulator M1 along wire 35, back contact of armature 36 of the relay 24, front contact of armature 37 of relay S1, wire 38, generator G, and wire 39 to the opposite terminal of the modulator M1. It follows then that during the release period of the relay S1 the coils 8 and 9 are supplied with carrier current from the generator G modulated at the frequency of the modulator M1.

At the end of the release period of the relay S1 its armatures drop to open the circuit to the relay S2 at the front contact of armature 21. As relay S2 is also provided with slow-release characteristics its armatures remain in engagement with their front contacts during the release period of that relay. The output circuit for the generator G to the inductor coils 8 and 9 is still retained closed at the front contact of the armature 40 and also at the front contact of the armature 44, but the circuit for the modulator M1 is now open at the front contact of armature 37. While relay S2 remains up after relay S1 drops, a circuit is completed for the modulator M2 along wire 41, back contact of armature 42 of relay 24, front contact of armature 43 of relay S2, back contact of armature 37 of relay S1, wire 38, generator G and wire 39 to the opposite terminal of the modulator M2. Thus during the release period of the relay S2 the carrier current supplied to the coils 8 and 9 from the generator G is modulated at the frequency of the modulator M2. At the end of the the release period of the relay S2 its armatures drop to open the circuit to the relay S3 at the front contact of the armature 27. Relay S3 is also provided with slow-release characteristics and thus during the period its armatures remain in engagement with their front contacts after the relay S2 is deenergized the output circuit for the generator G is still retained closed at the front contact of the armature 44, and a circuit for the modulator M1 is closed along the wire 35, back contact of armature 36, front contact of armature 45 of relay S3, back contact of armature 43 of relay S2, back contact of armature 37 of relay S1, wire 38, generator G and wire 39 to the opposite terminal of modulator M1. Thus during the release period of the relay S3 the carrier current supplied to the coils 8 and 9 is modulated at the frequency of M1.

It will now be seen that with the handle 3 at the running position and with the relay 11 energized the relays 10, S1, S2 and S3 are in turn picked up. Then when relay 11 becomes deenergized the relay 10 immediately drops to close the transmitting circuit from the generator G to the coils 8 and 9 and to initiate the deenergizing of the relays S1, S2 and S3 successively. Assuming that the release period of each of the relays S1, S2 and S3 is equal to one-fourth of a second, it will be seen that the coils 8 and 9 are supplied during the entire period with a carrier current that is modulated first at the frequency of M1, then at the frequency of M2, and then again at the frequency of M1. The result is that under the running condition of the brake valve EV the traffic rails 1 and 1ª are supplied with carrier current of a given frequency modulated in a predetermined order at different modulating frequencies each of which exists for a predetermined interval with substantially no intermission between the intervals.

Consider now the case when the handle 3 is moved to the lap position so that the relay L is energized in place of the relay R. When the relay 11 becomes energized the relays 10 and S1 are in turn energized by the same circuits traced under the running condition of the handle 3. With relay L up and relay S1 energized, current flows from the positive terminal of the battery B along wire 13, front contact of the armature 46 of relay L, front contact of armature 21 of relay S1, winding of relay S2, wire 22, back contact of armature 23 of relay 24, and wires 25 and 18 to the negative terminal of battery B. Under the lap position of handle 3 there exists no circuit for the relay S3 and thus that relay remains deenergized. When the relay L was energized it closed the transmitting circuit from the generator G at front contact of its armature 48 and thus when the relay 11 becomes deenergized the operation of the relays 10, S1 and S2 will be the same as above described for the running position of the handle 3. As the relay S3 this time remains inactive the order of modulating the carrier current supplied by the generator G to the coils 8 and 9 will consist of an interval during which the modulator M1 is active and then an interval during which the modulator M2 is active. It follows then that under the lap condition of the brake valve EV the traffic rails 1 and 1ª are supplied with carrier current modulated for an interval at the frequency of M1 and then modulated for an equal interval at the frequency of M2.

Next assume that the handle 3 is moved to the service position so that the relay S is energized. As the relay 11 is operated the relays 10 and S1 function in the same manner as above described but as there is now no circuit for either the relays S2 or S3, these relays remain inactive during the service position of the handle 3. The energizing of the relay S completes the output circuit for the generator G at the front contact of its armature 47 and thus under the service condition of the brake valve EV the traffic rails are supplied with carrier current modulated at the single frequency of the modulator M1. As the front contacts of the armatures 29, 48 and 47 of the relays R, L and S, respectively, are connected in parallel in the output circuit of the generator G it is to be noted that this output circuit is closed when, and only when, one of these relays is energized. Thus when the handle 3 is moved to the emergency position and all three of the relays R, L and S become deenergized the output circuit for the generator G is open and no energy is supplied to the traffic rails.

To sum up thus far, under either the release or the running condition of the brake valve EV the locomotive equipment supplies to the traffic rails 1 and 1ª a carrier current modulated successively at the frequency of M1, then at the frequency of M2, and then at the frequency of M1 again. Under the lap condition of the brake valve EV the carrier current supplied to the traffic rails is first modulated at the frequency of M1 and then at the frequency of M2. Under the service condition of the brake valve EV the carrier current is modulated at the frequency of M1 only. When the emergency condition is established no carrier current is supplied by the generator G. Although a specific arrangement is here set out whereby the different conditions of valve EV establishes distinct codes of modulated carrier current impulses it will be understood that my invention is in no manner limited to this one arrangement of codes. Additional operating conditions can readily be provided for by arranging the modulated carrier current impulses in other orders of modulating frequencies. If necessary additional modulators can be provided and made active at times in the same manner as shown for the modulators M1 and M2 and with these additional modulators a still larger number of operating conditions can be established by arranging the modulators to be effective in different orders to thereby produce different groups of code impulses of modulated carrier current. The arrangement here disclosed will serve to illustrate the principle whereby I propose to establish different codes by successively modulating a carrier current by different modulating frequencies in different predetermined orders.

Referring to Fig. 2, the apparatus installed in the caboose includes inductor coils 49 and 50 similar to the coils 8 and 9 on the locomotive and these coils on the caboose are mounted in inductive relation with the traffic rails 1 and 1ª, respectively. The coils 49 and 50 are, at times, connected to the input circuit of a filter F through which current is applied to an amplifier AM. As will appear later, when the system is first put in service the relays 64 and 67 are deenergized, and a circuit is completed for a relay 76 from battery 60 along wire 61, winding of relay 76, back contact of armature 77, back contact of armature 78 and wires 79 and 72 to the negative terminal of battery 60. With relay 76 thus normally energized the input circuit from the coils 49 and 50 to the filter F is completed. This input circuit can be traced from the outside terminal of the coil 49 along wire 80, front contact of armature 81 of relay 76, wire 82, filter F and wire 83 to the outside terminal of the coil 50. This filter F and amplifier AM may be any one of several well known types and as their specific type forms no part of my invention they are indicated in the figure by a symbol only.

The output of the amplifier AM is applied to a selective network of sharply tuned circuits that include the two circuits 51 and 52 which in turn operate the primary relays 53 and 54, respectively. These selective circuits 51 and 52 are respectively tuned to resonance at the modulating frequencies of the modulators M1 and M2 of Fig. 1. Thus, when carrier current modulated at the frequency of M1 is picked up by the coils 49 and 50 and applied to the amplifier AM the circuit 51 supplies current to the relay 53 through the full wave rectifier 55 to energize that relay. Likewise, if the carrier current is modulated at the frequency of M2 the circuit 52 is responsive to supply current to the relay 54 through the full wave rectifier 57 to energize that relay. When the carrier current is periodically interrupted these primary relays 53 and 54 will be operated in step with the interruptions in accordance with the modulating frequency applied to the carrier current.

Associated with the primary relays 53 and 54 are two relays designated by the reference characters P and N. Each relay P and N is provided with two energizing windings designated as a and b. The relay N is a direct current neutral relay adapted to lift its armatures into engagement with front contacts whenever either of its windings a or b is energized. The relay P is a direct current polarized relay provided with a polar armature 59 and is so constructed that its polarized armature remains in the position to which it was last moved when the relay becomes deenergized. Whenever the relay 53 is picked up a circuit extends from the positive terminal of battery 60 along wire 61, the windings a of relays N and P in series, wire 62, front contact of armature 56 to the negative terminal of the battery 60. The polarity of the magnetic field created by the energizing of the winding a of the relay P is such as to cause its polarized armature 59 to be positioned in the right-hand position, that is, the position as shown in the figure. The energizing of the winding a of relay N causes it to lift its armatures into engagement with their front contacts. Whenever the relay 54 is picked up, a circuit is completed from the positive terminal of battery 60, along wire 61, the windings b of relays N and P in series, wire 63, and front contact of armature 58 of relay 54 to the negative terminal of battery 60. The polarity of the magnetic field created by the energizing of the winding b of the relay P is such as to cause the polarized armature 59 to seek the left-hand position, that is, the position opposite that shown in the figure. The energizing of the winding b of the relay N lifts the armatures of this relay into engagement with their front contacts the same as when the winding a is energized. From what has just been said, it is seen that whenever carrier current modulated at the frequency of M1 is picked up from the traffic rails by the coils 49 and 50 the relay 53 is operated, the relay N is energized and the polarized armature 59 of relay P is moved to its right-hand position. When the relay 54 is operated in response to carrier current modulated at the frequency of M2, the relay N is energized and the polarized armature 59 of the relay P is moved to its left-hand position.

When relay 53 is operated to pick up the relay N current flows from the positive terminal of the battery 60 along wire 61, the top winding of relay 64, front contact of armature 65 of relay N, wires 66 and 62, and front contact of armature 56 to the negative terminal of battery 60. When relay 54 is operated and relay N is picked up, current flows from the positive terminal of battery 60 along wire 61, top winding of relay 67, front contact of armature 68 of relay N, wires 69 and 63, and front contact of armature 58 to the negative terminal of battery 60. The relay 64 is provided with a stick circuit that extends from the wire 61 through the lower winding of the relay 64, front contact of its own armature 70, front contact of armature 71 of the relay N, and wire 72 to the negative terminal of the battery 60. Likewise the relay 67 is provided with a stick circuit that extends from the wire 61 through the lower winding of relay 67, front contact of its own armature 73, front contact of armature 71 of relay N and wire 72 back to the battery 60. It follows that once the relays 64 and 67 are picked up they are retained energized as long as the relay N remains energized. As the relays 64 and 67 become energized the circuit to the relay 76 is opened at the back contacts of the armatures 77 and 78. The circuit for the relay 76 is now completed by a by-pass circuit that includes the front contact of the armature 84 of the relay N as will be evident from an inspection of Fig. 2. As stated above, when the relay 53 is operated, the polarized armature 59 of relay P is moved to its right-hand position. With armature 59 in the right-hand position and relay N energized, a circuit is completed from the positive terminal of battery 60 along wire 61, right-hand contact of armature 59, front contact of armature 74 of relay N, lower winding of a relay 75 and wire 72 to the negative terminal of battery 60.

When neither of the relays 53 and 54 is operated in response to modulated carrier current picked up from the traffic rails the circuit to the relay N is opened and that relay is deenergized. As relays 64 and 67 are each provided with slow-release characteristics they will remain in their energized position during their release period after the relay N drops, and it follows that the relay 76 will become deenergized during the release period of the relays 64 and 67 due to the fact that its circuit is now open at the back contacts of armatures 77 and 78 and also at the front contact of the armature 84. As the relay 76 becomes deenergized the receiving circuit that includes the front contact of its armature 81 is opened while a transmitting circuit, to be shortly described, is closed at the back contact of the armature 81 to permit the sending of a return impulse from the caboose to the locomotive.

The caboose is equipped with a main reservoir MR, a feed valve FV, electropneumatic valves DR, DE and DS and a relay L1. The caboose, of course, will also be equipped with a compressor and all other apparatus necessary to insure ample supply of air pressure in the main reservoir MR. The valves DR and DS are each biased to a closed position and each is opened when its associated magnet 85 is energized. The valve DE is biased to an open position and is held closed when its magnet 85 is held energized. When the valve DR is open the brake pipe BP is connected to the feed valve FV and the auxiliary brake controlling mechanism reproduces the running condition of the engineer's brake valve EV on the locomotive. When the valve DS is open the brake pipe BP is connected to the atmosphere through a vent of such characteristics as to provide a reduction of the brake pipe pressure at substantially the service rate of the usual brake valve EV to effect the service application of the train brakes.

When the valve DE is open, that is, when its armature 85 is deenergized, the brake pipe is connected to atmosphere through a vent of such characteristics as to produce the emergency rate of reduction of the brake pipe pressure and an emergency application of the brakes. When the valve DE is held closed by its magnet being energized and both valves DR and DS are closed by their magnets being deenergized, both the supply and the exhaust for the brake pipe are blanked and the auxiliary mechanism reproduces the lap condition of the engineer's brake valve EV. In the form of the apparatus shown in Fig. 2, the magnet of the emergency valve DE is normally retained energized in series with either magnet of the valves DR or DS or in series with the winding of relay L1 to insure a "closed circuit" principle for the equipment. It will be understood, however, that any one of the magnets of the other brake valves may be used in a similar manner if it seems desirable to do so.

In describing the operation of the auxiliary brake controlling mechanism of Fig. 2, I shall first assume that the handle 3 of the brake valve EV is placed in the running position so that the traffic rails are supplied with carrier current modulated in the order of first at the frequency of modulator M1, then at the frequency of modulator M2, and then again at the frequency of M1. During the first interval while the carrier current is modulated by M1, the current picked up from the traffic rails by the coils 49 and 50 on the caboose is applied to the amplifier AM through the filter F to operate the primary relay 53 and thereby close the circuit through the windings $a$ of relays N and P. The relay N is picked up and the polarized armature 59 of relay P is held in the right-hand position. The picking up of relay N closes in turn the circuit to the upper winding of the relay 64 and that relay is energized. With armature 59 in the right-hand position and the armature 74 of relay N in engagement with its front contact the circuit to the lower winding of relay 75 is completed and that relay is energized. At the expiration of the first interval of modulated carrier current the second interval is started during which time the carrier current is modulated by M2 and the relay 54 on the caboose is operated. Due to the fact that there is substantially no intermission between the two intervals the relay N does not drop since it is almost immediately energized by its winding $b$ after the circuit to its winding $a$ is opened. As stated above, the relative polarity of the magnetic field created by energizing the winding $b$ of relay P positions the polarized armature 59 in the left-hand position. Since relay N is up as the primary relay 54 is operated the relay 67 is energized. At the expiration of the second interval the third interval is started during which the carrier current is again modulated at the frequency of M1 and the primary relay 53 again operated. As was the case at the beginning of the second interval the relay N remains energized but relay P reverses its polarized armature to the right-hand position. At the end of this code group of modulating frequencies, the relay 53 is deenergized and shortly afterwards the relay N also drops out. As both relays 64 and 67 are provided with slow-release characteristics they remain up for a period after relay N drops. As the polarized armature 59 of relay P is left in its right-hand position at the end of this code, a circuit for a relay 88 is completed from the positive terminal of battery 60 along wire 61, right-hand contact of armature 59, back contact of armature 74 of relay N, back contact of armature 86 of a relay 87, lower winding of the relay 88, back contact of armature 89 of relay N, front contact of armature 90 of relay 67 and wires 91 and 72 to the negative terminal of battery 60. With both relays 88 and 75 picked up, a circuit is now completed to the magnets of both the valves DE and DR. This last circuit extends from the positive terminal of battery 60 along the wires 61 and 92, magnet 85 of the valve DR, front contact of armature 93 of relay 88, back contact of armature 94 of a relay 97, front contact of armature 95 of relay 75, magnet 85 of the valve DE and wires 96 and 72 to the negative terminal of the battery 60. Both relays 75 and 88 are provided with slow-release characteristics and have a release period at least as great as a code group of modulating frequencies and thus it follows that as long as the handle 3 of Fig. 1 is at the running or release position so that the carrier current is modulated at intervals by the different frequencies in the order described above, the auxiliary brake mechanism is held at its running condition.

Assume next that the handle 3 is moved to the lap position where the carrier current transmitted by the locomotive apparatus is modulated in the order of first an interval at the frequency of M1 and then an interval at the frequency of M2. During the first interval when modulator M1 is active the primary relay 53 in the caboose is operated and the relays N, P, 64 and 75 are energized in the same manner as previously pointed out under the running condition. During the second interval when the modulator M2 is active the primary relay 54 in the caboose is operated and the relay 67 energized and the armature 59 of relay P is moved to its left-hand position. As relay 54 drops at the end of this code the relay N also drops and the polarized armature 59 is left in its left-hand position. A circuit is now completed from the battery 60 along wire 61, left-hand contact of the armature 59, back contact of armature 105 of relay 87, lower winding of the relay 97, back contact of armature 89 of relay N, front contact of armature 90 of relay 67 and wires 91 and 72 to the negative terminal of battery 60. As the relay 97 is provided with slow-release characteristics having a release period greater than the interval during which relay N is energized, the relays 97 and 75 remain energized as long as the handle 3 occupies the lap position, and the carrier current is modulated at intervals by M1 and M2. With relays 75 and 97 energized, a circuit is completed from the battery 60 along wires 61 and 92, winding of the relay L1, front contact of the armature 94 of relay 97, front contact of armature 95 of relay 75, magnet 85 of the emergency valve DE and wires 96 and 72 back to the battery 60. Thus the auxiliary brake mechanism reproduces in the caboose the lap condition set up on the locomotive.

Again, with the handle 3 at the service position where the carrier current transmitted by the locomotive equipment is modulated at the frequency of the modulator M1 only, the receipt of this impulse at the caboose operates the primary relay 53 and energizes the relays N, P, 64 and 75 as previously described. At the end of the code, the relay N drops while the armature 59 of relay P is left in the right-hand position. As the relay 75 only is retained energized a circuit is now completed from the battery 60 through the wires 61 and 92, magnet 85 of the valve DS, back contact of armature 93 of relay 88, back contact of armature 94 of relay 97, front contact of armature 95 of relay 75, magnet 85 of the valve DE and wires 96 and 72 back to the battery 60. Thus a service condition of the brake pipe pressure is effected by the auxiliary brake mechanism in the caboose when the handle 3 of the valve EV is moved to the service position. When the handle 3 is moved to the emergency position the circuit for supplying carrier current to the coils 8 and 9 on the locomotive is held open and thus no energy is transmitted to the caboose with the result that the valve DE is deenergized to effect an emergency condition of the brake pipe pressure.

As stated earlier in the specification after the carrier current has been modulated at different frequencies in a predetemined order to establish a code for a given brake condition, a return indication impulse is transmitted from the caboose to the locomotive. To this end the caboose is provided with a generator G and two modulators M1 and M2 which may be and peferably are similar to the generator and modulators on the locomotive. Normally the caboose modulator M1 is active to modulate the output of its associated generator. The circuit for M1 is completed through a normally closed contact of a signaling key K as will be readily observed by an inspection of Fig. 2. It will be recalled that the relay 76 is deenergized at the end of a code group of impulses due to the fact that the relays 64 and 67 remain up during a slow-release period after the relay N is dropped. When relay 76 becomes deenergized a transmitting circuit is formed that extends from the outside terminal of the coil 49 through the wire 80, back contact of the armature 81 of relay 76, wire 131, contact 98 attached to and operated by the moving part of the valve DR and closed when that valve is open, wire 99, generator G and wires 100 and 83 to the outside terminal of the inductor coil 50. At the expiration of the slow-release period of the relays 64 and 67, these relays both drop and the circuit for the relay 76 is again completed to reenergize that relay with the result that the inductor coils 49 and 50 are disconnected from the generator G and again connected to the filter F. When the auxiliary mechanism occupies the lap position, the above-traced transmitting circuit is closed at the front contact of the armature 106 of the relay L1. If the auxiliary mechanism effects the service condition then this transmitting circuit is closed at the contact 107 operated by the movable part of the valve DS and closed when that valve is opened. Thus it is seen that at the end of a control code the relay 76 on the caboose is deenergized and the coils 49 and 50 are disconnected from the receiving circuit and connected to a transmitting circuit and a return impulse modulated at the frequency of the modulator M1 in the caboose is transmitted to the traffic rails, during the slow-release period of the relays 64 and 67.

Referring again to Fig. 1, the locomotive is equipped with a filter F and an amplifier AM which may be and preferably are similar to the filter and amplifier in the caboose. The output of the amplifier AM of Fig. 1 includes a network of selectively tuned circuits 101 and 102 which are tuned to resonance at the frequency of the modulators M1 and M2 of Fig. 2, respectively. The circuit 101 controls the relay 11 through the rectifier 103 and the circuit 102 controls the relay 12 through the rectifier 104 and thus it follows that when carrier current modulated at the frequency of M1 is supplied to the amplifier AM through the filter F the relay 11 is energized and when the current is modulated at the frequency of M2 the relay 12 is energized.

On the locomotive a receiving circuit is provided which extends from the filter F through the wire 122, back contacts of armatures 123, 124 and 125 of relays S3, S2 and S1, respectively, wires 126 and 33, coils 8 and 9 and wires 34 and 127 to the opposite terminal of the filter F. A by-pass from the wire 122 extends through the front contact of the armature 32 of the relay 10 to the wire 33. Thus, this receiving circuit is completed whenever the relays S1, S2 and S3 are all deenergized or whenever the relay 10 is energized. That is to say, as soon as the locomotive apparatus has completed the sending of a control code the locomotive receiving circuit is completed and the apparatus placed in a condition ready to receive the return impulse from the caboose. As this receiving circuit is held closed as long as the relay 10 is energized it is to be noted that the locomotive apparatus remains in the receiving condition as long as the primary relay 11 is operated in response to the return indication impulse. When relay 11 is energized the circuit completed includes not only the relay 10 but also the winding of the relay 15 and the winding $a$ of the polarized relay 16. With relay 15 energized a circuit is completed from the positive terminal of the battery B through the indicating device 108 which may be a light or a magnet, front contact of the armature 109 of relay 15 and wire 18 to the negative terminal of battery B. The relay 15 is provided with slow-release characteristics of such duration that this relay remains energized from one return impulse to the next and thus for all conditions of the auxiliary brake mechanism in the caboose, except for the emergency condition, the indicating device 108 is rendered active to indicate to the operator on the locomotive that the apparatus in the caboose is functioning properly. The polarity of the magnetic field created by the energizing of the winding $a$ of the relay 16 is such as to hold the polarized armature 110 in the left-hand position and thus normally this relay 16 performs no useful function.

In summing up the normal operation of the system as far as it pertains to governing the operation of the auxiliary brake mechanism it is to be observed that the receipt of an indication impulse on the locomotive energizes the relay 11 which in turn causes the indicating device 108 to be displayed and also energizes the relays 10, S1, S2 and S3 in accordance with the position of the handle 3. At the expiration of the indication impulse whose duration is determined by the release period of the relays 64 and 67 in the caboose, the relay 11 is deenergized and the relay 10 drops to switch the inductor coils 8 and 9 from the receiving circuit to the sending circuit and carrier current is supplied to the inductor coils 8 and 9. The relays S1, S2 and S3 function to modulate the carrier current in some predetermined order, the code depending upon the position of the handle 3 of the valve EV. After the carrier current has been modulated in a predetermined order the locomotive apparatus is switched back to the receiving circuit waiting for a return indication impulse. On the caboose the receipt of the control code effects a setting up of the pneumatic valves of the auxiliary brake mechanism in such a manner that it establishes a condition of the brake pipe pressure that corresponds to the condition established by the engineer's valve EV. It then transfers the inductor coils from the receiving circuit to the sending circuit and a return indication impulse is transmitted from the caboose for a predetermined period which is equal to the slow release period of the relays 64 and 67, providing the electropneumatic valves occupy the proper position. At the expiration of the return impulse the caboose apparatus is automatically switched back to the receiving circuit ready to receive the next group of control impulses from the locomotive. This operation is then repeated in cyclic order as long as the condition of the brake valve EV remains unchanged. A change in the condition of the valve EV causes the next code group to be sent from the locomotive to correspond to the new condition of the valve EV. However, the new group can be initiated only after the next indication impulse has been received.

On the locomotive a starting relay 128 is provided. This relay is normally retained energized by a simple circuit which includes the winding of the relay 128 and a front contact of the armature 129 of the relay S1. The relay 128 is made slow-releasing and remains energized from one code group to the next. As relay S1 is energized with each code, it follows that this relay 128 will remain energized under all normal operating conditions of the system except for the emergency condition of the valve EV. At the start when the system is first cut into service or at a time when no code impulses are being sent out from the locomotive the relay S1 is deenergized and thus the relay 128 is down. When relay 128 drops it completes at the back contact of its armature 130, a circuit from the winding of the relay 10 to the wire 18 leading to the negative terminal of the battery B so that the relay 10 is picked up and in turn the relay S1 energized even though the primary relay 11 is inactive. As relay S1 becomes energized it completes the circuit for relay 128 with the result that the circuit for the relay 10 is now open and both relays 10 and S1 become deenergized. At the expiration of the release period of relay 128 it drops to again close the circuit to the relay 10 and the above operation of these relays 10, S1 and 128 is repeated. As soon, however, as the handle 3 is placed at one of the operating conditions, the relays S1, S2 and S3 function the next time relay 10 is picked up to transmit a code to the caboose equipment and a return impulse is received at the locomotive to operate the relay 11 after which the normal operation of the system remains in effect and relay 128 becomes inactive.

Whenever the crew in the caboose desires to signal to the operator on the locomotive they move the signaling key K to its dotted line position where the modulator M2 is rendered active. The return impulses are now modulated at the frequency of M2 instead of at the frequency of M1 and thus the primary relay 12 on the locomotive is operated in place of the primary relay 11. When relay 12 is energized and its armature 111 brought into engagement with its front contact the same circuit as controlled by the relay 11 is completed except that the circuit now includes the winding $b$ of relay 16 in place of the winding $a$. The magnetic field created by the energizing of the winding $b$ of relay 16 causes the polarized armature 110 to be moved to the right-hand position where it closes a circuit through the signaling device 112 as will be readily observed from Fig. 1. Thus as long as the crew in the caboose hold the key K at its signaling position not only is the indicating device 108 active but also the signaling device 112. By means of the signaling device 112 any predetermined code message can be readily transmitted from the caboose to the locomotive.

The sending of signal messages from the locomotive is accomplished by means of the signaling key K1. The depressing of the key K1 to its dotted line position closes the circuit for the relay 24 from the positive terminal of battery B along wire 13, winding of relay 24, signal key K1, wire 113, front contact of armature 114 of relay 10 and wire 18 to the negative terminal of battery B. Once the relay 24 is energized it can be retained energized by a stick circuit that includes the front contact of its own armature 115 and the back contact of the armature 114 of relay 10. With the relay 24 picked up the previously traced circuits for the modulators M1 and M2 are opened and a new circuit completed for the modulator M2 along wire 41, front contact of armature 36, front contact of armature 37 of relay S1 as relay S1 is energized whenever the relay 10 is energized, wire 38, generator G and wire 39 to the other terminal of modulator M2. When the relay 10 drops at the expiration of the next return impulse it completes the transmitting circuit at the back contact of its armature 32 the same as under normal conditions, inasmuch as the relay S1 remains energized during its release period to hold its armature 31 in engagement with its front contact. As the circuit for the relays S2 and S3 are now held open at the back contact of the armature 23 of relay 24, it follows that a communicating impulse modulated at the frequency of M2, is now substituted for whatever control code is being sent at the time. In order that the communicating impulse may not interrupt a control code group, it is to be noted that the relay 24 can be energized only when the relay 10 is energized and this occurs only during the interval between code groups. Also it is to be noted that once relay 24 is energized it can be deenergized only when the relay 10 is energized. Hence communicating impulses from the locomotive can neither be started nor stopped except during the interval between code groups and splitting up of the latter is, therefore avoided.

When communicating impulses are sent from the locomotive they are received in the caboose as follows: Suppose that a running code is being transmitted and that at a given time a communicating impulse is substituted therefor so that the locomotive apparatus is now transmitting impulses all modulated at the frequency of M2. These impulses energize the primary relay 54 in the caboose which in turn energize relays P, N and 67 in the same manner as previously described. A circuit for the relay 87 is now completed from the positive terminal of battery 60 through wires 61 and 116, winding of relay 87, back contact of armature 117 of relay 64, front contact of armature 90 of relay 67 and wires 91 and 72 back to the battery 60. With relay 87 energized, a circuit is now closed through the signaling device 118 that extends from the wire 116 through the signaling device 118, front contact of armature 119 of relay 87 and wire 72 to the negative terminal of the battery 60. A stick circuit is now formed for the relay 88 from the wire 116 through the top winding of the relay 88, front contact of its own armature 120 and the front contact of the armature 119 of the relay 87. Likewise a stick circuit is formed for the relay 75 from the wire 116 through a top winding of the relay 75, the front contact of its own armature 121 and the front contact of the armature 119 of relay 87. By means of these stick circuits the relays 88 and 75 are retained energized during the time that communicating impulses are being received in the caboose and thus the running condition of the auxiliary brake mechanism is maintained during the time a signal is being received in the caboose from the locomotive. When a signal message is completed the running code is again transmitted from the locomotive and the normal condition of the caboose apparatus reestablished. Communicating impulses are received in the caboose from the locomotive in a similar manner under either lap or service condition of the brake valve EV.

A control system such as here disclosed will provide a large number of different operating codes from but a few different frequencies, permitting thereby a large number of non-interfering control systems being established from a relatively few frequency channels. The signaling and the sending of the control code impulses, as well as the return indication impulse is accomplished by means of standard relays insuring a reliable operation for the system.

Although I have herein shown and described only one form of apparatus embodying my invention, it is understood that various changes and modifications may be made therein within the scope of the appended claims without departing from the spirit and scope of my invention.

Having thus described my invention, what I claim is:

1. A control system including, a transmitting circuit, means to supply to the transmitting circuit periodic impulses of carrier current arranged with a predetermined period between successive impulses, means to modulate each impulse at different modulating frequencies with each modulation lasting for a given interval and arranged with substantially no intermission between the intervals forming thereby each carrier current impulse into a code group of control impulses, a receiving circuit controlled by the transmitting circuit, a neutral relay governed by the receiving circuit retained energized during each code group and deenergized during the period between two code groups, a polarized relay governed by the receiving circuit and selectively responsive to the modulating frequency of each control impulse of a code group, and a control mechanism jointly controlled by said neutral and polarized relays.

2. A control system including a transmitting circuit, means to supply to the transmitting circuit periodic impulses of carrier current arranged with a predetermined period between successive impulses, means to modulate each impulse at different modulating frequencies with each modulation lasting for a given interval and arranged with substantially no intermission between the intervals forming thereby each carrier current impulse into a given code group of control impulses, manually controlled means to establish different code groups, a receiving circuit controlled by the transmitting circuit, a neutral relay governed by the receiving circuit retained energized during each code group and deenergized during the period between two code groups, a polarized relay governed by the receiving circuit and selectively responsive to the modulating frequency of each code impulse of a code group, and a control mechanism jointly controlled by said neutral and polarized relays selectively responsive to the different code groups of control impulses.

3. A control system including, a transmitting circuit, means to supply to the transmitting circuit periodic impulses of carrier current arranged with a predetermined period between successive impulses, means to modulate each impulse at different frequencies with each modulation lasting for a given interval and arranged with substantially no intermission between the intervals forming thereby each carrier current impulse into a given code group of control impulses, manually controlled means to establish different code groups of modulating frequencies, a receiving circuit controlled by the transmitting circuit, a first control means governed by the receiving circuit retained energized as long as control impulses with no intermission between impulses occur and deenergized at the end of a code group of control impulses, a second control means governed by the receiving circuit and selectively responsive to the modulating frequency of each control impulse, and a controlling mechanism jointly controlled by said first and second control means selectively responsive to the different code groups of control impulses.

4. A control system including, a controlling mechanism capable of producing a plurality of different operating conditions, electroresponsive means associated with said mechanism selectively responsive to different code groups of modulating frequencies impressed on a carrier current to effect the different operating conditions, transmitting means including a plurality of slow-release relays capable of being formed into different groups so arranged that the relays of any group will be deenergized successively, means controlled by each group of relays to supply to the electroresponsive means a carrier current during the entire period of deenergizing the group and to modulate the current at a different frequency during the release period of each individual relay of the group, and a manually controlled means to select the different groups of relays and to periodically energize the relays of the selected group.

5. A control system comprising in combination with a manually operated control device at one point having different control functions, an auxiliary controlling mechanism at another point capable of reproducing the functions of the control device, a transmitting circuit, a source of carrier current, a plurality of different modulators, a plurality of slow-releasing relays capable of being formed into a different group for each condition of the control device, and arranged that the relays of a group are periodically energized and then deenergized successively, means controlled by each group to supply to the transmitting circuit carrier current during the entire period the group is being deenergized and to modulate the current with a different modulator during the release period of each individual relay of the group to form thereby a distinctive code group, and an electroresponsive device governed by the transmitting circuit selectively responsive to the different code groups for causing the condition of the auxiliary mechanism to register with the condition of the control device.

6. A control system comprising in combination with a manually operated control device at one point having different control functions, a source of carrier current, modulating means for modulating the output of said source at different frequencies for different positions of the control device, auxiliary controlling mechanism at another point capable of reproducing the functions of the control device, electroresponsive means associated with said auxiliary mechanism selectively responsive to the different modulating frequencies for causing the condition of the auxiliary mechanism to register with the position of the control device, another manually operated means at said one point adapted when actuated to render the above-mentioned modulating means ineffective and to modulate the carrier current at a distinctive frequency, a signaling means including a relay at said other point controlled by said electroresponsive means and responsive to said distinctive modulating frequency to establish a signal, and stick circuit means governed by said relay to retain the auxiliary mechanism in its established condition.

7. A control system comprising in combination with a manually operated control device at one point having different control functions, a source of current, coding means for coding the output of said source at different codes for different positions of the control device, auxiliary controlling mechanism at another point capable of reproducing the functions of the control device, electroresponsive means associated with said auxiliary mechanism selectively responsive to the different codes for causing the condition of the auxiliary mechanism to register with the position of the control-device, another manually operated means at said one point adapted when actuated to render said coding means ineffective and to establish a distinctive code impulse of the current, a signaling means including a relay at said other point controlled by said electroresponsive means and responsive to said distinctive current impulse to establish a signal, and stick circuit means governed by said relay to retain the auxiliary mechanism in its established condition.

ANDREW J. SORENSEN.